United States Patent
Visintainer et al.

(10) Patent No.: US 10,810,871 B2
(45) Date of Patent: Oct. 20, 2020

(54) VEHICLE CLASSIFICATION SYSTEM

(71) Applicant: Ford Global Technologies, LLC, Dearborn, MI (US)

(72) Inventors: Randal Henry Visintainer, Ann Arbor, MI (US); Rajendra Rao, Los Gatos, CA (US); John A Lockwood, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 295 days.

(21) Appl. No.: 16/023,255

(22) Filed: Jun. 29, 2018

(65) Prior Publication Data

US 2020/0005631 A1    Jan. 2, 2020

(51) Int. Cl.

| G08G 1/01 | (2006.01) |
|---|---|
| G08G 1/017 | (2006.01) |
| G08G 1/04 | (2006.01) |
| B60W 30/095 | (2012.01) |
| B60W 40/04 | (2006.01) |
| G06K 9/00 | (2006.01) |
| G06K 19/06 | (2006.01) |
| G07C 5/00 | (2006.01) |

(52) U.S. Cl.
CPC ......... *G08G 1/017* (2013.01); *B60W 30/0956* (2013.01); *B60W 40/04* (2013.01); *G06K 9/00536* (2013.01); *G06K 19/06037* (2013.01); *G08G 1/04* (2013.01); *G06K 2209/23* (2013.01); *G07C 5/008* (2013.01)

(58) Field of Classification Search
CPC ....................................................... G08G 1/017
See application file for complete search history.

(56) References Cited

U.S. PATENT DOCUMENTS

| 5,495,576 A * | 2/1996 | Ritchey ................... G06T 17/00 345/420 |
|---|---|---|
| 9,239,955 B2 | 1/2016 | Bhanu |
| 9,731,713 B2 | 8/2017 | Horii |
| 9,818,154 B1 | 11/2017 | Wilbert |
| 2008/0189176 A1 | 8/2008 | Burns |
| 2013/0184980 A1 * | 7/2013 | Ichikawa ............... B25J 9/1676 701/301 |
| 2014/0306799 A1 * | 10/2014 | Ricci ....................... H04W 4/12 340/5.83 |

(Continued)

FOREIGN PATENT DOCUMENTS

| CN | 105336172 B | 2/2016 |
|---|---|---|
| DE | 102013003044 A1 | 8/2014 |
| WO | WO-200807076 A1 | 1/2008 |

*Primary Examiner* — Alex C Dunn
(74) *Attorney, Agent, or Firm* — David R. Stevens; Stevens Law Group

(57) ABSTRACT

A vehicle bears labels describing handling characteristics of the vehicle for the benefit of autonomous vehicles in proximity to the vehicle. The labels may be nonvisible, such as through use of UV or IR inks. The labels may be present such that they are visible regardless of view direction and may be affixed using a vehicle wrap applied to panels of the vehicle. Autonomous vehicles detect the labels and retrieve handling characteristics from a local database or a remote server. The autonomous vehicles are therefore relieved from the processing required to predict or infer the handling characteristics of the vehicle.

20 Claims, 4 Drawing Sheets

(56) References Cited

U.S. PATENT DOCUMENTS

| | | | |
|---|---|---|---|
| 2014/0306826 A1* | 10/2014 | Ricci | G06Q 10/02 |
| | | | 340/573.1 |
| 2014/0309847 A1* | 10/2014 | Ricci | A61B 5/6808 |
| | | | 701/33.1 |
| 2015/0269258 A1* | 9/2015 | Hunt, Jr. | G06F 16/955 |
| | | | 707/770 |
| 2019/0225232 A1* | 7/2019 | Blau | B60W 50/0098 |
| 2019/0265709 A1* | 8/2019 | Saikyo | B60W 30/16 |
| 2019/0294171 A1* | 9/2019 | Maeda | G05D 1/0274 |
| 2019/0299887 A1* | 10/2019 | Sudo | H01T 19/00 |
| 2019/0316922 A1* | 10/2019 | Petersen | G01C 21/3617 |

\* cited by examiner

VEHICLE CLASSIFICATION SYSTEM

BACKGROUND

Field of the Invention

This invention relates to performing obstacle detection in autonomous vehicles.

Background of the Invention

One of the fundamental function needed to enable autonomous vehicles is detection and classification of obstacles and prediction of the intent of mobile obstacles, such as vehicles. In some approaches this is performed using machine learning algorithms that require large amounts of computing power and add significantly to the cost of developing an autonomous vehicle due to the large amount of training data required and the time required to repeatedly train, test, and otherwise improve the machine learning model.

What is needed is an improved approach for detecting, classifying, and predicting the intent of other vehicles.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
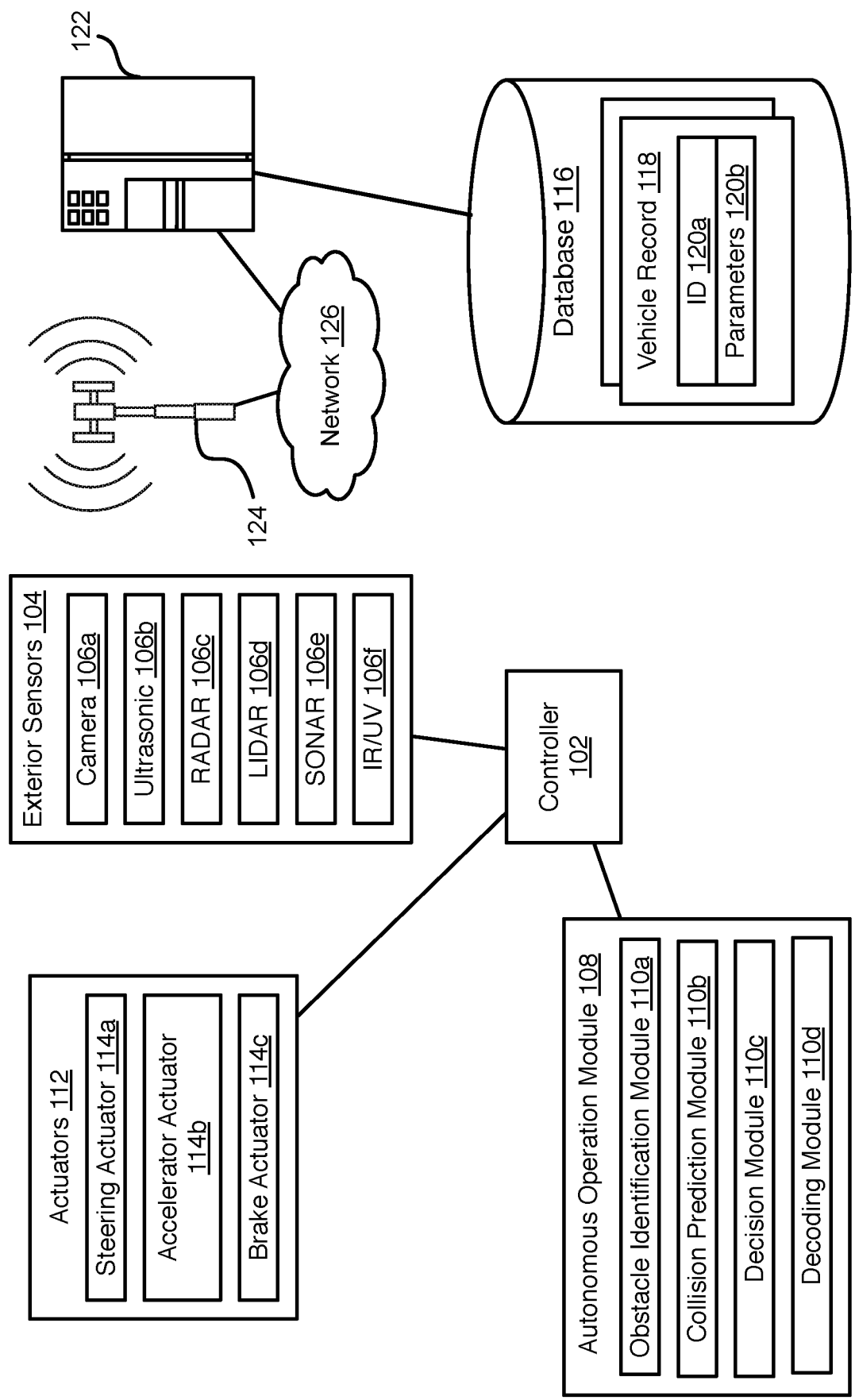
FIG. 1A is a schematic block diagram of components implementing a vehicle in accordance with an embodiment of the present invention.
Figure 1B:
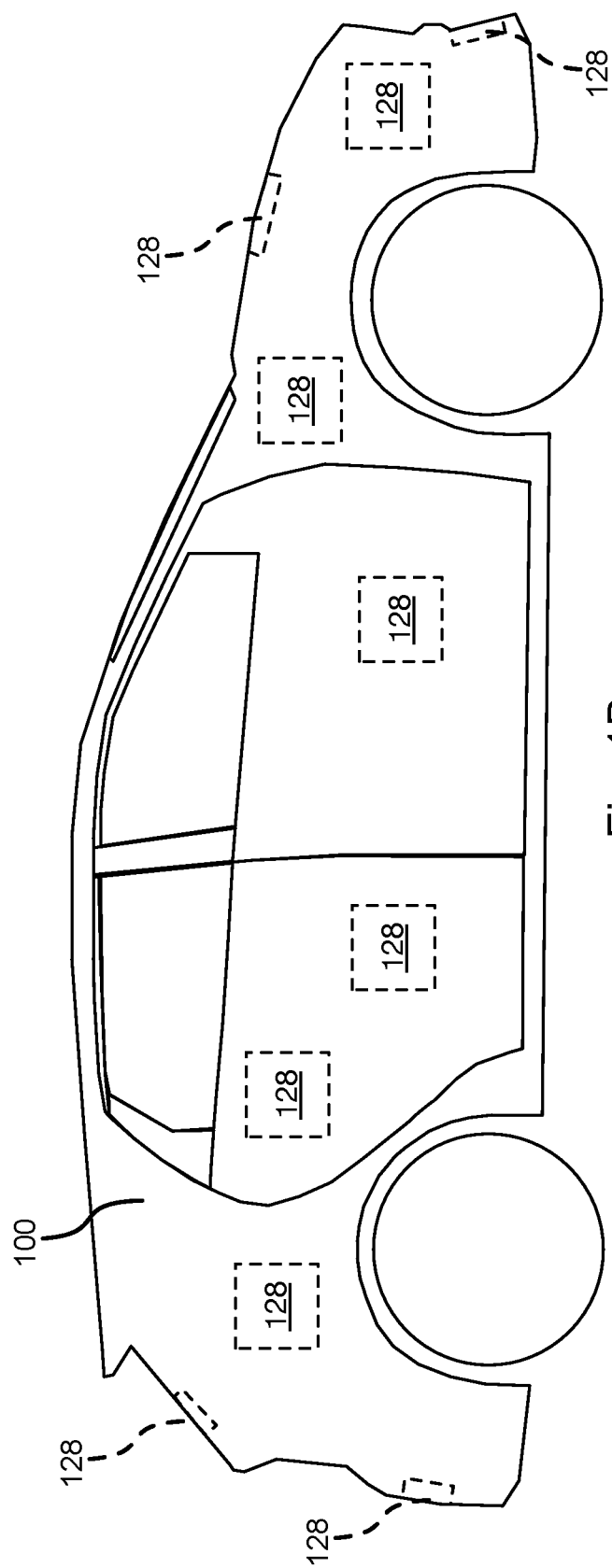
FIG. 1B is a schematic diagram of a wrapped vehicle in accordance with an embodiment of the present invention.

Referring to FIGS. 1A and 1B, a vehicle 100 (see FIG. 1B) may include any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 mounted in the vehicle 100 may perform autonomous navigation and collision avoidance. The controller 102 may receive one or more outputs from one or more exterior sensors 104. For example, one or more cameras 106a may be mounted to the vehicle 100 and output image streams received to the controller 102. In some embodiments, the exterior sensors 104 combined provide a 360-degree view around the vehicle 100. In other embodiments, a smaller viewing angle may be achieved by the exterior sensors 104, such as an angle between 180 and 270 degrees.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

In some embodiments, the exterior sensors 104 may include one or more cameras 106f capable of detecting wavelengths in either of the infrared (IR) range (larger than 700 nm) or the ultraviolet (UV) range (smaller than 400 nm). As discussed below, labels affixed to other vehicles may be detected using the one or more cameras 106f For example, a forward facing camera 106f and a rearward facing camera 106f may be used. Right and left facing cameras 106f may also be included.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

In some embodiments, information obtained through automated obstacle detection may be augmented with data explicitly encoded in labels affixed to other vehicles. In particular, the labels may communicate information concerning handling characteristics of the vehicle to which the labels are affixed. For example, the label may encode information regarding a classification, typical usage, or other indication of intent of the vehicle to which the label is affixed. Accordingly, the autonomous operation module 108 may include a decoding module 110d that is programmed to detect and decode labels on other vehicles. As described below, the labels may be detectable using cameras 106f that detect wavelengths in the non-visible spectrum (IR/UV)

In some embodiments, the decoding module 110d may decode a label of another vehicle by retrieving data describing the one or more handling characteristics corresponding to the label from a database 116. For example, the database 116 may store vehicle records 118 each including a vehicle identifier 120a that is either encoded in the label corresponding to the record 118 or is mapped to data encoded in the label corresponding to the record 118.

The record 118 may further include parameters 120b describing the one or more handling characteristics of a corresponding vehicle bearing the label corresponding to the record 118. The parameters 120b may be static parameters, such as a classification of the corresponding vehicle: coupe, sedan, sport utility vehicle (SUV), truck, delivery truck, box truck, etc. The parameters 120b may include dimensions of the corresponding vehicle (height, width, length). The parameters 120b may include parameters describing the braking force, tire grip, acceleration, engine or electric motor torque/power, turning radius, or other description of handling of the corresponding vehicle. The parameters 120b may include an indication of driver intent, such as the fact that the vehicle is performing deliveries, is individually owned and used for commuting, or other parameters that may be useful in predicting actions of the driver of the corresponding vehicle.

Note that similar vehicles (e.g., same type, make, model, ownership, etc.) may behave similarly and therefore may have identical labels or labels referring to the same vehicle record 118.

The parameters 120b may further include dynamic parameters that are updated by the corresponding vehicle, such as an intended route being followed by the corresponding vehicle.

The controller 102 may access the database 116 by way of a server system 122. For example, the controller 102 may communicate with a cellular data communication antenna 124 that is coupled to the server system 122 by way of a network 126.

In other embodiments, the database 116 may be stored locally on the vehicle 100 and accessed directly by the controller 102. For example, the controller 102 may periodically download the database 116 or updates to the database. For example, the controller 102 may download a portion of a database relating to vehicles within some threshold proximity to the vehicle 100, such as within 20 miles or some other radius.

Referring to FIG. 1B, a vehicle 100 that is an autonomous vehicle as described with respect to FIG. 1A may bear a plurality of labels 128 encoding one or more handling characteristics of the vehicle 100, such as some or all of the parameters 120b described above. Other vehicles or objects that are not autonomous may also have labels 128 affixed thereto in an identical manner to the vehicle 100.

As shown, the labels 128 may be affixed at multiple locations on the vehicle 100, such as on the front, rear, left, and right sides of the vehicle 100. As noted above, the labels may be printed with ink that is not visible to the human eye, such that ink that is visible only in the IR or UV spectrum. Any IR or UV ink known in the art may be used. The use of IR or UV inks may permit the labels to be visible despite variations in lighting. For example, IR inks may be more visible at night than human-visible inks.

In some embodiments, the labels 128 may be printed on a wrap that is adhered over the body panels of the vehicle such that the wrap covers a major portion of the outer surface (other than windows) of the vehicle 100. For example, each body panel of the vehicle 100 may have at least 80% of its entire outer surface covered with part of the wrap that includes at least one label 128. In some embodiments, front and rear bumpers and the roof may be excluded since the roof may not often be visible to other vehicles. The material used for the wrap and the manner of its application may be according to any method known in the art of vehicle wraps.

Figure 2:
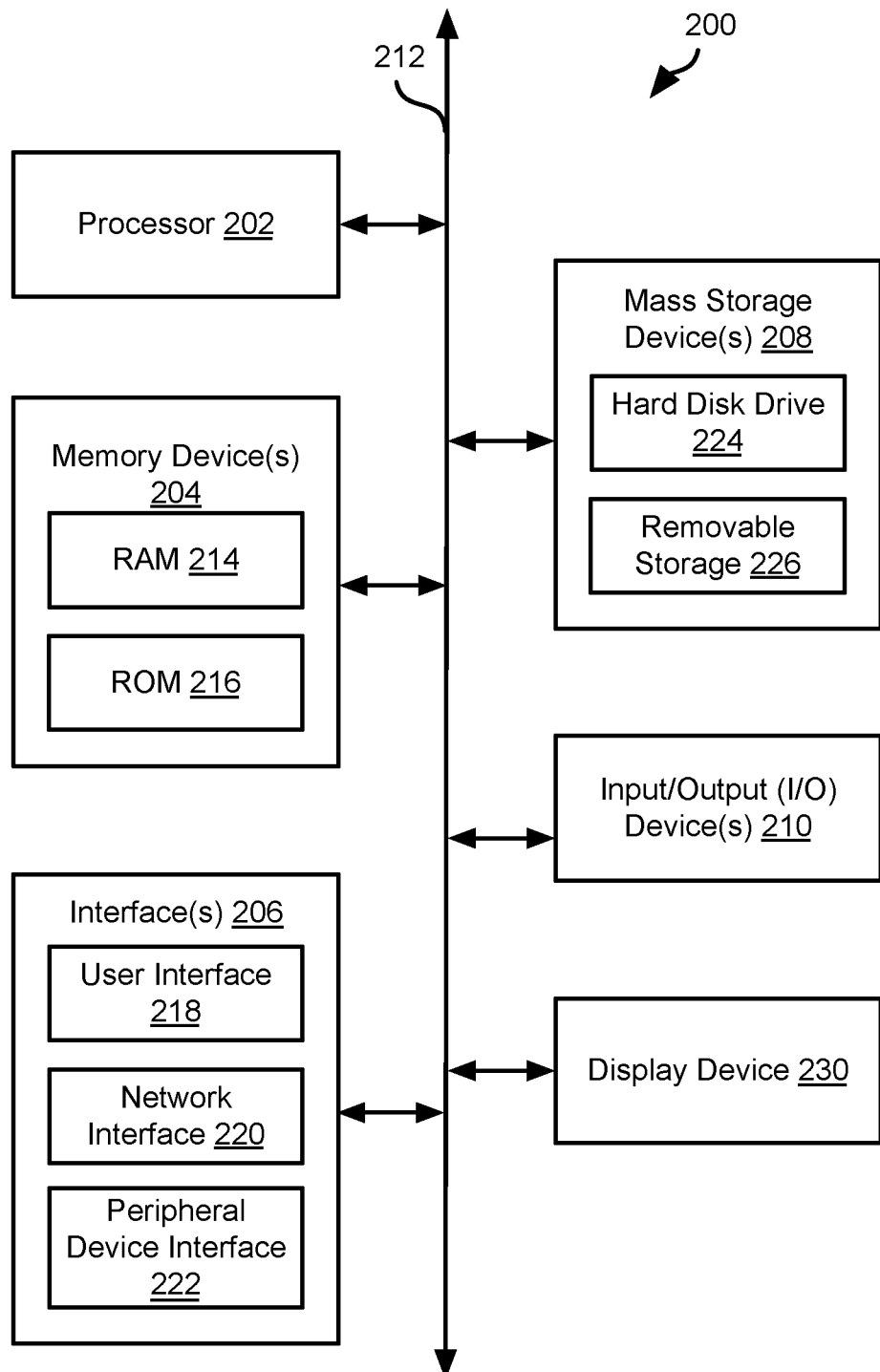
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 and server system 122 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
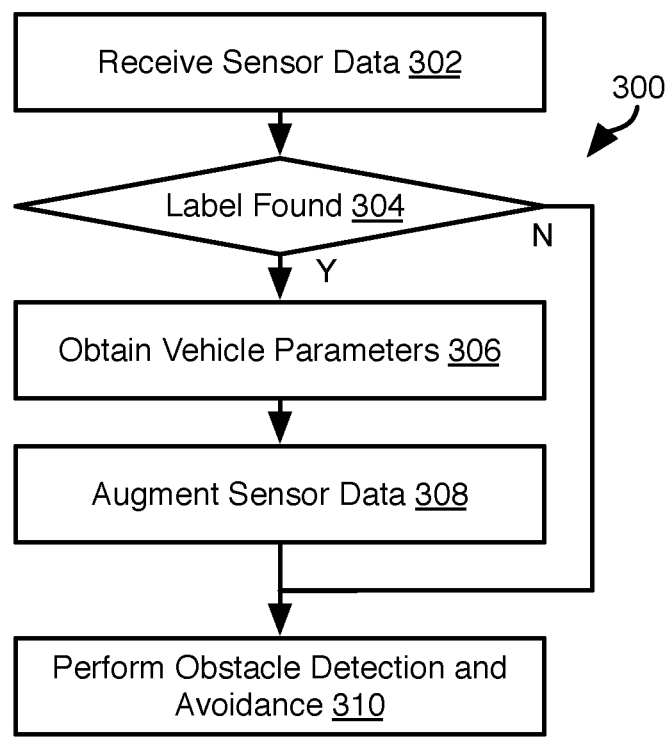
FIG. 3 is a process flow diagram of a method for using vehicle labels in accordance with an embodiment of the present invention.

FIG. 3 illustrates a method 300 that may be executed by the controller 102. The controller 102 may receive 302 sensor data from the exterior sensors 104. The controller evaluates 304 the sensor data to determine whether a label 108 has been found. For example, an image from the camera 106f may be evaluated to determine whether any labels 128 are visible in the image. If so, the method 300 may include obtaining 306 parameters corresponding to any labels 128 detected. As noted above, this may include retrieving parameters 120b from an entry in the database 118 corresponding to an identifier encoded in the label 128. The database 118 may be remote or local such that retrieving may include local retrieval or by requesting the parameters 120b from a remote server 122. The label 128 itself may be embodied as a QR (quick response) code, bar code, or plain text numbers and/or letters. Accordingly, step 304 may include decoding the label 128 to obtain an identifier that may be used to retrieve the corresponding vehicle record 118. In other embodiments, the parameters 120b are encoded in the label 128 itself and are obtained by decoding symbols on the label 128.

The method 300 may include augmenting 308 data obtained from the exterior sensors 104 with the parameters 120b obtained for each detected label. The method 300 may then include performing 310 obstacle detection and avoidance with respect to obstacles detected in the sensor data as augmented at step 308. In particular, analysis as to the size, braking power, acceleration, turning radius, driver intent, etc. of a vehicle having a detected label 128 may be omitted and the parameters 120b may be used instead. Accordingly, computation required to performs this function is avoided, which provides more computational resources to analyze unlabeled obstacles and to perform other analysis of the environment of the vehicle 100 in order to detect and avoid obstacles.

Note that entities other than autonomous or human operated vehicles may bear or read labels 128 as described herein. For example, cameras affixed to buildings or other infrastructure may detect labels 128 and relay information gathered to nearby vehicles using V2V (vehicle 2 vehicle) communication, such as dedicated short range communication (DSRC) protocol. In another example, images from cameras affixed to buildings or other infrastructure are processed by a stationary computer to detected pedestrians or other obstacles. The stationary computer may then relay this information to vehicles detected and identified using the labels 128 affixed to the vehicles. For example, on detecting a label 128, the stationary computer could retrieve and use parameters 120b describing a code or other information for establishing a wireless communication connection with the vehicle bearing the label 128 to establish a wireless connection with the vehicle.

FIG. 3 is only an example use case for labels 128 affixed to vehicles in the manner described above with respect to FIGS. 1A and 1B. In another use case, cameras affixed to infrastructure, such as traffic lights or other stationary fixtures may detect labels 128 and perform actions in response to the detection. For example, a camera at an intersection may be coupled to a traffic light controller. Upon detecting a label of an emergency vehicle (police, ambulance, fire truck), the traffic light controller may then control the lights to facilitate passage of the emergency vehicle through the intersection, such as by turning red all the lights controlling entrances to the intersection or by changing to green a light controlling the flow of traffic in the direction that the emergency vehicle is moving.

In the description above, labels 128 are described as being affixed to vehicles such as cars or trucks. However, any other object may have a label 128 as described above affixed thereto that includes classification and/or behavior information. For example, bicycles, motorcycles, clothing of pedestrians, buildings, road furniture (barriers, signs, etc.).

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A vehicle comprising:
   a vehicle body;
   a power source, wheels, and a drive train; and
   a covering on the outside of the vehicle body having a plurality of encoded labels distributed over front, rear, left, and right sides of the vehicle body, the encoded labels encoding data describing a handling characteristic of the vehicle.

2. The vehicle of claim 1, wherein the covering is a wrap covering a plurality of panels of the body.

3. The vehicle of claim 1, wherein the handling characteristic of the vehicle is a classification of the vehicle.

4. The vehicle of claim 1, wherein the handling characteristic of the vehicle is a usage of the vehicle.

5. The vehicle of claim 1, wherein the encoded labels are non-visible to a human eye.

6. The vehicle of claim 5, wherein the encoded labels are only visible at wavelengths larger than 700 nanometers.

7. The vehicle of claim 5, wherein the encoded labels are only visible at wavelengths smaller than 400 nanometers.

8. A method comprising:
   receiving, by a vehicle controller of a first vehicle, sensor data from exterior sensors mounted to the first vehicle, the exterior sensors including a camera;
   evaluating, by the vehicle controller, an image included in the sensor data;
   identifying, by the vehicle controller, a second vehicle having an encoded label in the image;
   decoding, by the vehicle controller, the encoded label to obtain a handling characteristic of the second vehicle; and
   performing obstacle avoidance with respect to the second vehicle based on the sensor data and the handling characteristic.

9. The method of claim 8, wherein the sensor data includes outputs from at least one of a light detection and ranging (LIDAR) sensor and a radio detection and ranging (RADAR) sensor.

10. The method of claim 8, further comprising capturing the image by the camera by detecting light with wavelengths not visible to a human eye.

11. The method of claim 8, further comprising capturing the image by the camera by detecting wavelengths larger than 700 nanometers.

12. The method of claim 8, further capturing the image by the camera by detecting wavelengths smaller than 400 nanometers.

13. The method of claim 8, wherein decoding the encoded label comprises:

extracting, by the vehicle controller, an identifier from the encoded label;

transmitting, by the vehicle controller, the identifier to a remote server; and receiving, by the vehicle controller, the handling characteristic from the remote server.

14. The method of claim 8, wherein decoding the encoded label comprises:

extracting, by the vehicle controller, an identifier from the encoded label;

retrieving, by the vehicle controller, the handling characteristic from an entry in a database stored in the vehicle, the entry corresponding to the identifier.

15. The method of claim 8, wherein the handling characteristic of the vehicle is a classification of the vehicle.

16. The method of claim 8, wherein the handling characteristic of the vehicle is a usage of the vehicle.

17. A method comprising:

providing a vehicle including a plurality of body panels, a power source, wheels, and a drive train;

encoding a handling characteristic of the vehicle in a label; and applying a wrap to the plurality of body panels such that the wrap completely covers the plurality of body panels, the wrap having copies of the label distributed throughout the wrap such that copies of the label are located on front, rear, left, and right sides of the vehicle body, the encoded labels encoding data describing a handling characteristic of the vehicle.

18. The method of claim 17, wherein the handling characteristic includes at least one of a classification and usage of the vehicle.

19. The method of claim 17, wherein the copies of the label are only visible at wavelengths larger than 700 nanometers.

20. The method of claim 17, wherein the copies of the label are only visible at wavelengths smaller than 400 nanometers.

* * * * *